(12) United States Patent
Elleouet et al.

(10) Patent No.: US 8,295,881 B2
(45) Date of Patent: Oct. 23, 2012

(54) VIRTUAL CARD (VCARD) CONTAINER FOR CREATING AND SENDING ELECTRONIC BUSINESS CARDS

(75) Inventors: Jerome Elleouet, Lannilis (FR); Eric Bramoulle, Brest (FR)

(73) Assignee: Alcatel Lucent, Paris (FR)

( * ) Notice: Subject to any disclaimer, the term of this patent is extended or adjusted under 35 U.S.C. 154(b) by 407 days.

(21) Appl. No.: 12/378,216

(22) Filed: Feb. 12, 2009

(65) Prior Publication Data

US 2010/0203873 A1     Aug. 12, 2010

(51) Int. Cl.
*H04M 1/00*     (2006.01)
(52) U.S. Cl. .................. 455/558; 455/518; 709/206
(58) Field of Classification Search .................. None
See application file for complete search history.

(56) References Cited

U.S. PATENT DOCUMENTS

| | | | |
|---|---|---|---|
| 2004/0243930 A1* | 12/2004 | Schowtka et al. | 715/513 |
| 2005/0100008 A1* | 5/2005 | Miyata et al. | 370/389 |
| 2006/0293904 A1* | 12/2006 | Ramanathan et al. | 705/1 |
| 2008/0096599 A1* | 4/2008 | Legrand et al. | 455/519 |

FOREIGN PATENT DOCUMENTS

WO     WO2007005606     *     1/2007

* cited by examiner

*Primary Examiner* — Shawki S Ismail
*Assistant Examiner* — Jany Tran
(74) *Attorney, Agent, or Firm* — Hitt Gaines, PC

(57) ABSTRACT

Virtual Card (VCARD) Container is an enhanced method and device for displaying VCARDs that includes a display of the VCARD file along with the graphical chart of the enterprise to allow recipients of the VCARDs to readily distinguish cards from two separate individuals at two separate enterprises. The VCARD Container allows the display of highly graphical VCARDs corresponding to the employee's enterprise during a communication between two parties. These VCARDs will be easily recognizable by the recipient of a phone call, for example, and when displayed, they will appear similar to a paper business card.

14 Claims, 4 Drawing Sheets

Annex (XML Schema of the Enterprise VCARD Graphical Chart)     20

```xml
<?xml version="1.0" encoding="UTF-8"?>
<xs:schema xmlns:xs="http://www.w3.org/2001/XMLSchema" elementFormDefault="qualified" attributeFormDefault="unqualified">
    <xs:element name="EnterpriseVisitCardChart">
        <xs:element name="background">  ——21
        <!--positionning information + the background (binary format) -->
            <xs:attribute name="x" type="xs:int" use="required"/>
            <xs:attribute name="y" type="xs:int" use="required"/>
            <xs:attribute name="width" type="xs:int" use="required"/>
            <xs:attribute name="height" type="xs:int" use="required"/>
            <xs:element name="image">
                <xs:attribute name="MIMEtype" type="xs:string" use="required"/>
                <xs:attribute name="content" type="xs:string" use="required"/>
            </xs:element >
        </xs:element >

<xs:element name="logo">  ——22
        <!--positionning information + the logo (binary format) -->
            <xs:attribute name="x" type="xs:int" use="required"/>
            <xs:attribute name="y" type="xs:int" use="required"/>
            <xs:attribute name="width" type="xs:int" use="required"/>
            <xs:attribute name="height" type="xs:int" use="required"/>
            <xs:element name="image">
                <xs:attribute name="MIMEtype" type="xs:string" use="required"/>
                <xs:attribute name="content" type="xs:string" use="required"/>
            </xs:element >
        </xs:element >

<xs:element name="photo">  ——23
        <!--only positionning information / the photo is present in the VCF file -->
            <xs:attribute name="x" type="xs:int" use="required"/>
            <xs:attribute name="y" type="xs:int" use="required"/>
            <xs:attribute name="width" type="xs:int" use="required"/>
            <xs:attribute name="height" type="xs:int" use="required"/>
        </xs:element >

<xs:element name="name">  ——24
        <!--only positionning & font information / the 'name' is present in the VCF file -->
            <xs:attribute name="x" type="xs:int" use="required"/>
            <xs:attribute name="y" type="xs:int" use="required"/>
            <xs:attribute name="width" type="xs:int" use="required"/>
            <xs:attribute name="height" type="xs:int" use="required"/>
            <xs:element name="font">
                <xs:attribute name="type" type="xs:string" use="required"/>
                <xs:attribute name="size" type="xs:string" use="required"/>
                <xs:attribute name="style" type="xs:string" use="required"/>
                <xs:attribute name="color" type="xs:string" use="required"/>
            </xs:element >
        </xs:element >
```

FIG.2A

```xml
<xs:element name="job description">           ──25                                  20
<!--only positionning & font information / the 'job description' is present in the VCF file -->
    <xs:attribute name="x" type="xs:int" use="required"/>
    <xs:attribute name="y" type="xs:int" use="required"/>
    <xs:attribute name="width" type="xs:int" use="required"/>
    <xs:attribute name="height" type="xs:int" use="required"/>
    <xs:element name="font">
        <xs:attribute name="type" type="xs:string" use="required"/>
        <xs:attribute name="size" type="xs:string" use="required"/>
        <xs:attribute name="style" type="xs:string" use="required"/>
        <xs:attribute name="color" type="xs:string" use="required"/>
    </xs:element >
</xs:element >
<xs:element name="postal address">           ──26
<!--only positionning & font information / the 'postal address' is present in the VCF file -->
    <xs:attribute name="x" type="xs:int" use="required"/>
    <xs:attribute name="y" type="xs:int" use="required"/>
    <xs:attribute name="width" type="xs:int" use="required"/>
    <xs:attribute name="height" type="xs:int" use="required"/>
    <xs:element name="font">
        <xs:attribute name="type" type="xs:string" use="required"/>
        <xs:attribute name="size" type="xs:string" use="required"/>
        <xs:attribute name="style" type="xs:string" use="required"/>
        <xs:attribute name="color" type="xs:string" use="required"/>
    </xs:element >
</xs:element >
<xs:element name="email address">           ──27
<!--only positionning & font information / the 'email address' is present in the VCF file -->
    <xs:attribute name="x" type="xs:int" use="required"/>
    <xs:attribute name="y" type="xs:int" use="required"/>
    <xs:attribute name="width" type="xs:int" use="required"/>
    <xs:attribute name="height" type="xs:int" use="required"/>
    <xs:element name="font">
        <xs:attribute name="type" type="xs:string" use="required"/>
        <xs:attribute name="size" type="xs:string" use="required"/>
        <xs:attribute name="style" type="xs:string" use="required"/>
        <xs:attribute name="color" type="xs:string" use="required"/>
    </xs:element >
</xs:element >
<xs:element name="phone numbers">           ──28
<!--only positionning & font information / the 'phone numbers' is present in the VCF file -->
    <xs:attribute name="x" type="xs:int" use="required"/>
    <xs:attribute name="y" type="xs:int" use="required"/>
    <xs:attribute name="width" type="xs:int" use="required"/>
    <xs:attribute name="height" type="xs:int" use="required"/>
    <xs:element name="font">
        <xs:attribute name="type" type="xs:string" use="required"/>
        <xs:attribute name="size" type="xs:string" use="required"/>
```

FIG.2B

```
                                                                        20
            <xs:attribute name="style" type="xs:string" use="required"/>
            <xs:attribute name="color" type="xs:string" use="required"/>
         </xs:element>
      </xs:element>
   </xs:element>
</xs:schema>
```

FIG.2C

VIRTUAL CARD (VCARD) CONTAINER FOR CREATING AND SENDING ELECTRONIC BUSINESS CARDS

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to the electronic business card industry. The invention discussed herein is in the general classification of enhanced virtual cards (VCARDs).

BACKGROUND

VCARD, sometimes referred to as vCard, is a popular format developed to exchange personal business information. VCARD was developed to allow individuals to easily share contact information with other people. A VCARD file includes text information usually showing an individual's name, home and business addresses, phone numbers and photograph along with the logo of a company or enterprise affiliated with the individual.

A VCARD is the electronic equivalent of the paper visit card or traditional business card. It presents business and/or personal contact information either necessary or desirable for an individual's client, prospective client, friend or other contact to interact with the individual. VCARDs utilize a standard file format and usually are attached to e-mail messages.

Some high level applications offer the option of sending a VCARD during a Voice-Over-Internet Protocol (VOIP) communication. This allows participants to exchange exact and updated information about them and provide visual information like an enterprise logo or the participant's position/job title in the enterprise.

During a VOIP communication, users often desire to send a VCARD that fully suits the enterprise graphical chart. However, a VCARD is displayed in the same manner, no matter the identity of the caller or business entity of the caller. MS Outlook always displays a VCARD using a "Contact Card" template which means that the information present in the VCARD varies, but the presentation (except for logo) remains unaltered.

The VCARD graphical chart of an enterprise describes the size of the VCARD, the background of the VCARD, and the color, type and size for the display of the various information presented on the VCARD. This chart is defined by the enterprise and is the same for all employees at the enterprise. Only information about the employee himself changes from one VCARD to another within an enterprise.

Each enterprise has a graphical chart which typically includes the logo of an enterprise and often contains a complex definition of a set of regulations for text items (e.g. an enterprise wants "job description" to always be displayed using Arial-10pt-Bold-Black).

In most applications displaying VCARDs, including softphone applications, this information is lost because all VCARDS are displayed using a common template. Only information about the sender of the VCARD is different.

The best existing solution known today for exchange of VCARDS in VOIP communications is described in WO/2008/046697, a patent published in April 2008 and entitled "Enrichment of the Signaling in a Communication Session of 'Push to Talk' Type by Inserting a Business Card."

This patent describes the way for a caller to send his VCARD to the call recipient in a way that permits the call recipient to know the identity of the caller. The solution presented in this patent utilizes the Session Description Protocol (SDP) portion of the Session Initiation Protocol (SIP) invite message to deliver the VCARD.

Under current technology, for two correspondents using the same softphone client application, two VCARDs always look the same. The only difference between the two VCARDs of two individuals at two different enterprises involves personal information (photo, name, phones, email addresses, job description) listed on the VCARDs and the enterprise logo on the VCARDs. In other words, the presentation format of the VCARDs is similar and will not serve to differentiate two different callers from two different enterprises without careful inspection of the VCARD information and logo.

When an individual is receiving a call from caller 1 or caller 2, the look and feel of the application will always be the same (for example using My Instant Communicator).

The only visual difference between two different callers can be seen through the enterprise logo of the caller. The graphical chart of the enterprise (visible on paper visit cards) is not displayed. As a result, two paper business cards that are very different result in two very similar looking cards in the softphone.

While information included in the VCARD is very important to identify someone, it is equally important for purposes of quick identification of a party for the information contained in the enterprise graphical chart of the business card to be displayed.

Hence, there is a need in the art for a convenient to use, reliable, inexpensive and efficient method and device for displaying VCARDs that include the graphical chart of the enterprise to allow recipients of the VCARDs to readily distinguish cards from two separate individuals at two separate enterprises.

SUMMARY OF THE DISCLOSURE

VCARD Container is a method and device for displaying VCARDs that includes a display of the VCARD file along with the graphical chart of the enterprise to allow recipients of the VCARDs to readily distinguish cards from two separate individuals at two separate enterprises.

The VCARD Container allows the display of highly graphical VCARDs corresponding to the employee's enterprise during a communication between two parties. These VCARDs will be easily recognizable by the recipient of a phone call, for example.

Paper visit card are often exchanged after a discussion between two persons. The current invention attempts to reproduce the paper visit cards in a form adapted to electronic or telephonic communication. At every moment during a telephone communication, for example, an application offers a way for participants to exchange their VCARDs. The caller can also choose (through customization) to automatically send his VCARD when calling someone.

In the preferred embodiment of this invention, a VCARD container is built for the VCARD file and the enterprise VCARD graphical chart. The VCARD file manages information about the individual while the enterprise VCARD graphical chart contains information about graphical items that will also be present (size, location, color, etc.). This VCARD container will be exchanged between the participants to the communication (instead of simply the VCARD file) to provide a highly graphical business enterprise-oriented presentation of the VCARD.

The preferred embodiment of the invention utilizes a method for building a VCARD container that includes the traditional VCARD file and the display of the graphical chart of the enterprise to allow recipients of the VCARD container to readily distinguish VCARDs from two separate individuals at two separate enterprises.

The principal object of this invention is to build a VCARD container that includes the traditional VCARD file and the graphical chart of the enterprise to allow recipients of the VCARD container to readily distinguish cards from two separate individuals at two separate enterprises.

Another object of this invention is to display a VCARD container that includes the traditional VCARD file and the graphical chart of the enterprise to allow recipients of the VCARD container to readily distinguish cards from two separate individuals at two separate enterprises.

Another object of this invention is to provide a method that efficiently builds and displays a VCARD container that includes the traditional VCARD file and the graphical chart of the enterprise to allow recipients of the VCARD container to readily distinguish cards from two separate individuals at two separate enterprises.

Another object of this invention is to provide a method that is relatively inexpensive to implement for building and displaying a VCARD container that includes the traditional VCARD file and the graphical chart of the enterprise to allow recipients of the VCARD container to readily distinguish cards from two separate individuals at two separate enterprises.

Another object of this invention is to provide a reliable method for building and displaying a VCARD container that includes the traditional VCARD file and the graphical chart of the enterprise to allow recipients of the VCARD container to readily distinguish cards from two separate individuals at two separate enterprises.

BRIEF DESCRIPTION OF THE DRAWINGS

FIG. 2A-FIG. 2C depict the XML Schema of the Enterprise VCARD Graphical Chart.

DETAILED DESCRIPTION OF THE DRAWINGS

Figure 1:
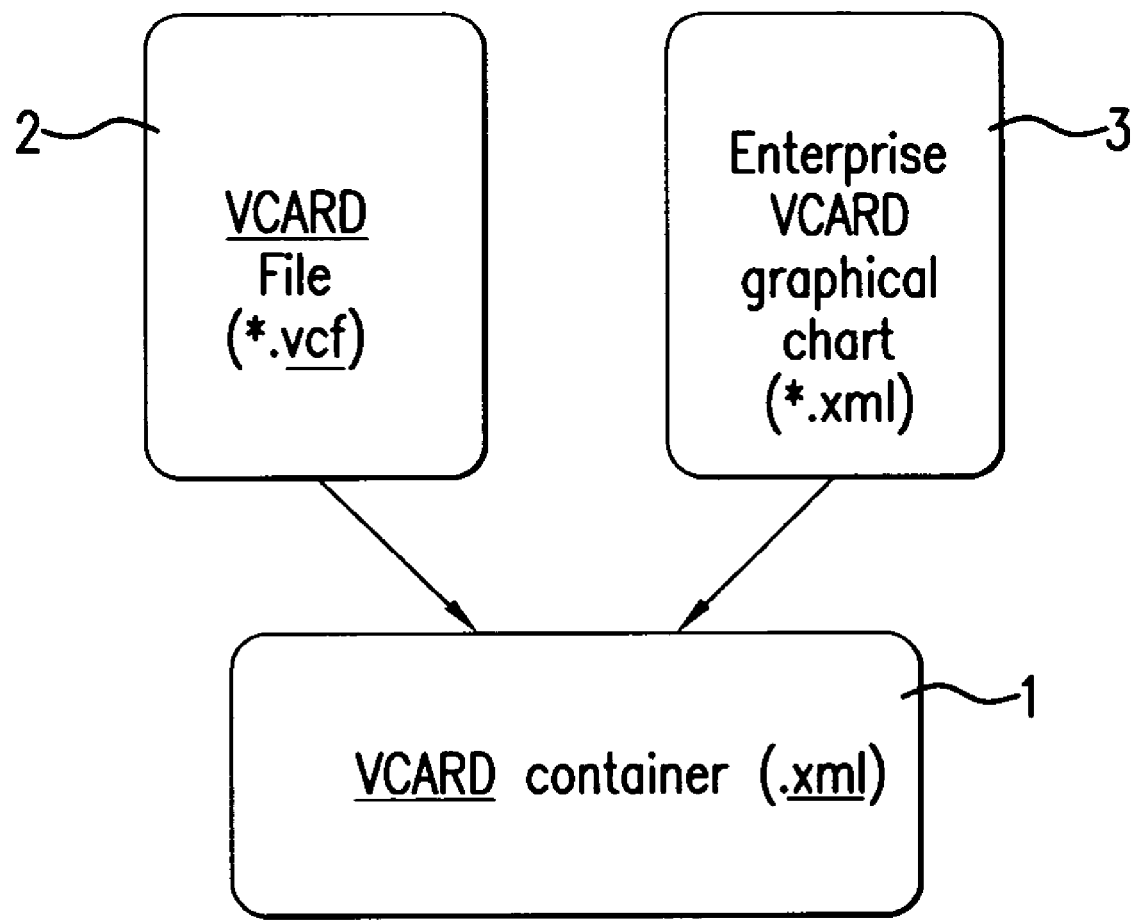
FIG. 1 depicts a diagram showing the files combining to create the VCARD container.

FIG. 1 depicts a diagram showing the files combining to create the VCARD container 1. When two participants utilize, for example, the Alcatel-Lucent Omnitouch My Instant Communicator, each participant of the session can send directly to the other participants his VCARD container 1 using the corresponding button (i.e. SEND VCARD) or the drag and drop of an e-mailer contact card from MS Outlook.

It will be possible through customization of the client application (e.g. My Instant Communicator) for a caller to send automatically the VCARD container 1 as soon as the call is active or to send manually the VCARD container 1 during a communication.

The recipient of a call can then consult the VCARD container 1 of the caller in the My Instant Communicator application (e.g. "fly over" when the mouse goes over the corresponding session). The VCARD container 1 is comprised of two components: the VCARD File 2 and the Enterprise VCARD graphical chart 3.

The caller information is present in the VCARD File 2 that can be imported from Outlook, for example. The VCARD File 2 is in the form of a VCF file in this preferred embodiment. The VCARD File 2 contains the name, the job description, the photograph, a list of phone numbers, the e-mail address, and the postal address of the caller in this preferred embodiment. However, additional information may also be present in the VCARD File 2.

For example, for a given caller, a VCARD File might include the name John Doe, with a professional listing of software engineer, a photograph of John Doe, the phone number (555) 555-5555 to reach John Doe, an e-mail address of Johndoe@company.com and a physical address to send communications to John Doe at Company, 555 Company Drive, Austin, Tex. 78750.

The Enterprise VCARD graphical chart 3 is defined in an XML file in this preferred embodiment. In the preferred embodiment, the Enterprise VCARD graphical chart 3 contains information about the graphical format of the VCARD file 2 including, the background location and size (which is the same for all enterprise employees in most cases), the enterprise logo location and size, the logo (same for all enterprise employees), the photo location and size, the name location, size and font description, the email address location, size and font description, the postal address location, size and font description, and the phone numbers location, size and font description.

The VCF file constituting the VCARD File 2 and the XML file constituting the Enterprise VCARD graphical chart 3 are automatically merged by an application to provide the VCARD container 1 in the form of an XML file. The resulting VCARD container 1 will allow for name elements such as the size of the name in terms of width and height, the font (e.g. Arial) utilized in printing the name, the size (e.g. 10 point) of the font in printing the name, the style (e.g. bold) of the font for the name and the color (e.g. black) of the font for the name. This allows each user to customize his card to distinguish it from other enterprises.

In this preferred embodiment, the VCARD container 1 is sent in the User Datagram Protocol (UDP) part of the SIP invite message (as the .vcf file was sent in the WO/2008/046697 patent) and can be displayed in the softphone client during the "ringing incoming" phase or later during the communication between parties.

This solution allows all individual information available in a VCARD to be combined with the graphical presentation of the enterprise to allow the presentation of a card similar to a paper business card which can be different from one caller at one enterprise to another caller at a different enterprise.

FIG. 2A-FIG. 2C depict the XML Schema of the Enterprise VCARD Graphical Chart 20. The XML Schema of the Enterprise VCARD Graphical Chart 20, in this example, includes lines related to the background for the enterprise 21, the logo of the enterprise 22, the photo of a caller 23 in the enterprise, the name of the caller 24 in the enterprise, the job description of the caller 25 in the enterprise, the postal address for the caller 26 in the enterprise, the e-mail address for the caller 27 in the enterprise, and the phone number(s) for the caller 28 in the enterprise.

In FIG. 2A, in the lines related to the background for the enterprise 21, the height and width of the background of the VCARD is established. The color of the background may also be customized.

In the lines related to the logo of the enterprise 22, the width and height of the logo and the location of the logo on the VCARD is established.

In the lines related to the photo of a caller 23 in the enterprise, the width and height of the photo and the location of the photo on the VCARD is established.

In the lines related to the name of the caller 24 in the enterprise, a name of a user along with information regarding the width and height of the type, the font type, the font style, the font color and the location of the name on the VCARD is established.

In FIG. 2B, in the lines related to the job description of the caller 25 in the enterprise, information regarding the width and height of the type, the font type, the style, color and location of the job description on the VCARD is established.

In the lines related to the postal address for the caller 26 in the enterprise, information regarding the width and height of the type, the font type, the font style, the font color and the location of the postal address on the VCARD is established.

In the lines related to the e-mail address for the caller 27 in the enterprise, information regarding the width and height of the type, the font type, the font style, the font color and the location of the e-mail address on the VCARD is established.

In the lines related to the phone number for the caller 28 in the enterprise, information regarding the width and height of the type, the font type, the font style, the font color and the location of the phone number on the VCARD is established.

It is contemplated that the method described herein can be implemented as software, including a computer-readable medium having program instructions executing on a computer, hardware, firmware, or a combination thereof. The method described herein also may be implemented in various combinations on hardware and/or software.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A device for creating a virtual card (VCARD) container, comprising:
    a memory device containing a set of instructions; and
    a processor device for processing the set of instructions, wherein:
        the set of instructions include instructions for creating a VCARD file with information regarding a user; and
        the set of instructions include instructions for creating an enterprise VCARD graphical chart containing information regarding a graphical format of the VCARD file for the enterprise, including a set of regulations for a graphic presentation of text items of information for users of the enterprise, such that a visual presentation of the graphical format of the VCARD sent during a Voice-Over-Internet-Protocol (VOIP) communication is visually distinguishable during the active VOIP communication from a second enterprise VCARD graphical chart for a second enterprise including visual distinguishably of the graphic presentation of the text items for users of the second enterprise.

2. The device of claim 1, wherein the VCARD file is stored on the device in as a virtual card filename extension (VCF) file format.

3. The device of claim 1, wherein the information regarding the user includes information regarding the user's name, the user's job description, the user's photograph, the user's phone number, the user's e-mail address and the user's physical mailing address.

4. The device of claim 1, wherein the enterprise VCARD graphical chart is stored on the memory device in an Extensible Markup Language (XML) file format.

5. The device of claim 1, wherein the information regarding the graphical format of the VCARD file includes graphical information about a background, a logo, a photograph, an e-mail address, a name, a job description, a phone number and a physical mailing address.

6. The device of claim 1, wherein the VCARD container is stored on the device in an Extensible Markup Language (XML) file format that is formed via the merging of a virtual card filename extension (VCF) formatted VCARD file and a XML formatted file of the VCARD graphical chart.

7. The device of claim 1, wherein the set of instructions further includes:
    merging the first VCARD graphical chart with the first VCARD file to create a first VCARD container, and merging second VCARD graphical chart with the second VCARD file to create second VCARD container; and
    sending the first or the second VCARD container as part of a Session Initiation Protocol invite message.

8. A method of building a virtual card (VCARD) container, comprising the steps of:
    (a) creating a VCARD file at a device;
    (b) creating an enterprise VCARD graphical chart at the device; and
    (c) merging the VCARD file with the enterprise VCARD graphical chart at the device to create the VCARD container; and
    (d) sending the VCARD container in a User Datagram Protocol (UDP) part of a Session Initiation Protocol (SIP) invite message,
    wherein the enterprise VCARD graphical chart contains information regarding a graphical format of the VCARD file for the enterprise, including a set of regulations for a graphic presentation of text items of information for users of the enterprise, such that a visual presentation of the graphical format of the VCARD sent during a Voice-Over-Internet-Protocol (VOIP) communication is visually distinguishable from a second enterprise VCARD graphical chart for a second enterprise, including visual distinguishably of the graphic presentation of the text items for users of the second enterprise.

9. The method of claim 8, wherein the step of creating the VCARD file includes storing the VCARD file on the device in a virtual card filename extension (VCF) file format.

10. The method of claim 8, wherein the step of creating the VCARD file includes storing information regarding a user's name, a user's job description a user's photograph, a user's phone number, a user's e-mail address and a user's physical mailing address.

11. The method of claim 8, wherein the step of creating the enterprise VCARD graphical chart includes storing the VCARD file on the device in an Extensible Markup Language (XML) file format.

12. The method of claim 8, wherein the step of creating the enterprise VCARD graphical chart includes creating information about the graphical format of the VCARD file.

13. The method of claim 12, wherein the step of creating information about the graphical format of the VCARD file includes creating graphical information about a background, a logo, a photo, a job description, an e-mail address, a name, a phone number and a physical mailing address.

14. A method of electronically displaying an individual's information comprising:

(a) receiving a virtual card (VCARD) container having a VCARD file and an enterprise VCARD graphical chart sent in a User Datagram Protocol (UDP) part of a Session Initiation Protocol (SIP) invite message; and (b) displaying the VCARD container in a softphone client during the ringing incoming phase of a communication between parties, wherein the enterprise VCARD graphical chart contains information regarding a graphical format of the VCARD file for the enterprise, including a set of regulations for a graphic presentation of text items of information for users of the enterprise, such that a visual presentation of the graphical format of the VCARD sent during a Voice-Over-Internet-Protocol (VOIP) communication is visually distinguishable from a second enterprise VCARD graphical chart for a second enterprise including visual distinguishably of the graphic presentation of the text items for users of the second enterprise.

* * * * *